United States Patent [19]

Wu et al.

[11] 3,886,165

[45] May 27, 1975

[54] INDOLYLIMIDOYLHETEROCYCLICS

[75] Inventors: Yao Hua Wu; Richard P. Ryan, Jr., both of Evansville, Ind.

[73] Assignee: Mead Johnson & Company, Evansville, Ind.

[22] Filed: Nov. 13, 1972

[21] Appl. No.: 306,065

[52] U.S. Cl....... 260/288 R; 260/286 A; 260/319.1; 260/326.16; 260/326.85; 424/250
[51] Int. Cl.............................................. C07d 33/50
[58] Field of Search ................................. 260/288 R

[56] References Cited
UNITED STATES PATENTS

| | | | |
|---|---|---|---|
| 3,331,849 | 7/1967 | Shavel et al..................... | 260/288 R |
| 3,370,063 | 2/1968 | Suh.................................. | 260/288 R |
| 3,697,553 | 10/1972 | Wu et al......................... | 260/326.11 |

OTHER PUBLICATIONS

Colonna et al., Gazz. Chim. Ital., 96 (11), pp. 1410–1422, 1966.

*Primary Examiner*—Donald G. Daus
*Assistant Examiner*—Mary C. Vaughn
*Attorney, Agent, or Firm*—Robert H. Uloth; Robert E. Carnahan

[57] ABSTRACT

Heterocyclic bases such as quinolines, isoquinolines, benzoquinolines and phenanthridine react with indole and carboxamides in the presence of phosphorus oxychloride to provide indolylimidoylheterocyclic derivatives. Derivatives incorporating a dihydroquinoline, dihydroisoquinoline or dihydrobenzoquinoline moiety can be reduced to provide corresponding tetrahydro analogs. Typical examples of indolyl derivatives are 1,2-dihydro-6-methoxy-2-(5-methoxy-3-indolyl)-1-(5-methyl-1-pyrrolin-2-yl)quinoline and 1-(5,5-dimethyl-1-pyrrolin-2-yl)-1,2,3,4-tetrahydro-6-methoxy-2-(5-methoxy-3-indolyl)quinoline. The indolyl derivatives are useful as diuretic and antithrombogenic agents.

23 Claims, No Drawings

INDOLYLIMIDOYLHETEROCYCLICS

BACKGROUND OF THE INVENTION

This invention pertains to heterocyclic carbon compounds which have drug and bio-affecting properties. In particular, this invention relates to indolyl derivatives incorporating an imidoylheterocyclic moiety. Imidozlheterocyclics include imidoyldihydroquinolines, imidoyltetrahydroquinolines, imidoyldihydroisoquinolines, imidoyltetrahydroisoquinolines, imidoyldihydrobenzoquinolines, imidoyltetrahydrobenzoquinolines, and imidoylphenanthridine. The indoylyl derivatives are of value as diuretic and antithrombogenic agents. Other features of the invention are a therapeutic process for producing diuretic and antithrombogenic effects in mammals by administration of the indolyl derivatives and pharmaceutical compositions containing same.

In connection with the state of the art, there can be mentioned the class of 1-imidoyl-2-(3-indolyl)indolines which are reported to be of value as diuretic agents according to Y. H. Wu, et al., J. Med. Chem., 15, 529 (1972) and U.S. Pat. No. 3,697,553.

SUMMARY OF THE INVENTION

This invention relates to novel indolyl derivatives of Formula I and pharmaceutically acceptable acid addition salts thereof.

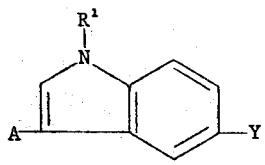

(I)

The substances represented by Formula I are novel compositions of matter and are useful as diuretic agents and as inhibitors of blood platelet aggregation in mammals.

In the above formula, the symbols "A, $R^1$, and Y" have the following meanings:

$R^1$ represents hydrogen or lower alkyl while Y represents hydrogen or lower alkoxy. The symbol A is a heterocyclic radical selected from the group consisting of

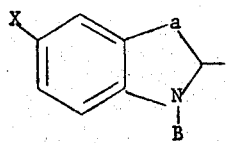 , 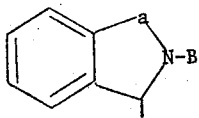

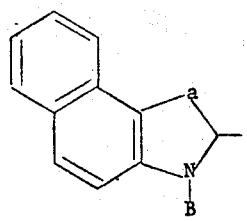 , 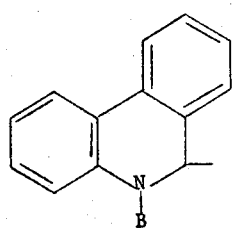

wherein B represents the radical

a is -CH=CH- or -CH$_2$CH$_2$-; X represents hydrogen or lower alkoxy; $R^2$ represents hydrogen; $R^3$ represents lower alkyl or cycloalkyl of 3 to 6 atoms such as cyclopropyl, cyclobutyl, cyclopentyl, and the like; and $R^2$ and $R^3$ can be optionally joined together to form a five-membered heterocyclic ring which may be sutstituted by up to 2 lower alkyl groups.

It will be apparent to those skilled in the art that compounds of Formula I occur in at least one racemic stereoisomeric modification inasmuch as they contain at least one asymmetric center, namely, the carbon atom of the "heterocyclic radical A" attached to the 3-position of indole. In some instances, an additional asymmetric carbon atom is present in the B substituent and two racemic modifications exist. Illustrative of a B substituent having an asymmetric carbon atom is 5-methyl-b 1-pyrrolin-2-yl. Mixtures of racemic modifications can be separated into the individual (±)-pairs on the basis of physico-chemical differences such as solubility. The (±)-pairs can be resolved according to conventional procedures by using appropriate optically active acids. It is to be understood that all stereoisomeric forms are within the purview of this invention, but in general, the racemic forms are preferred.

The indolyl compounds of the present invntion characterized by Formula I are obtained by: reacting a carboxamide of the formula

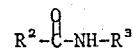

(II)

wherein $R^2$ and $R^3$ have the same meaning as previously defined, an indole of the formula

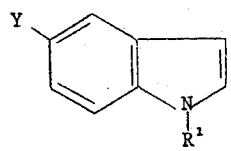

(III)

wherein $R^1$ and Y are previously defined, with a compound selected from the group consisting of 5,6-benzoquinoline, phenantridine, a quinoline of the formula

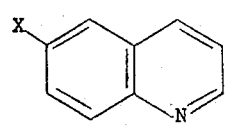

(IV)

wherein X is as previously defined and an isoquinoline of the formula

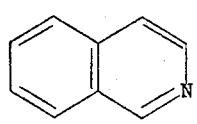

(V)

in the presence of phosphorus oxychloride in an inert solvent to provide compounds corresponding to indolyldihydroquinolines of the formula

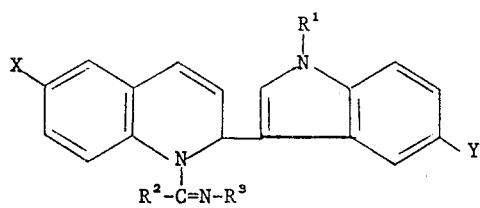

(VI)

indolyldihydroisoquinolines of the formula

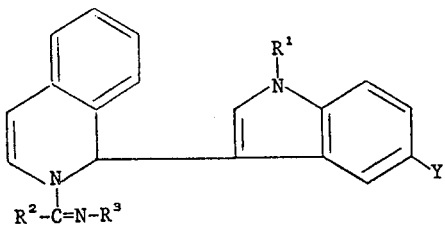

(VII)

indolyldihydrobenzoquinolines of formula

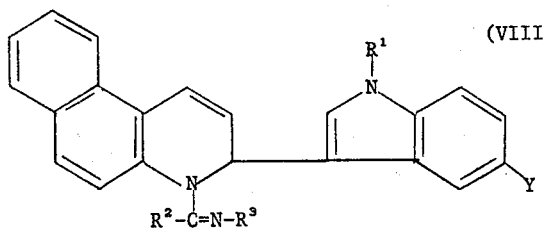

(VIII)

indolylphenanthridines of the formula

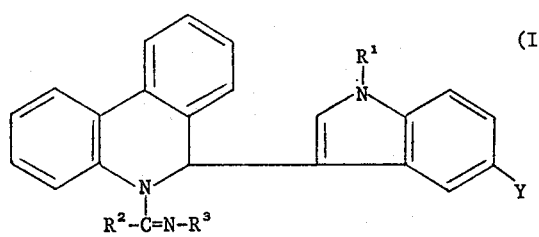

(IX)

and thereafter, if desired, reducing said compounds of Formulas VI-VIII to indolyltetrahydroquinolines of the formula

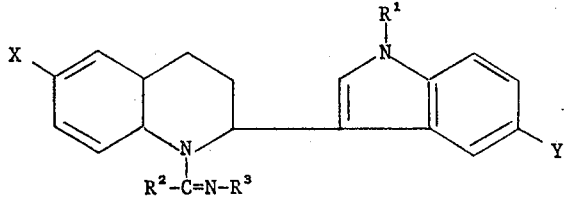

(X)

indolyltetrahydroisoquinolines of the formula

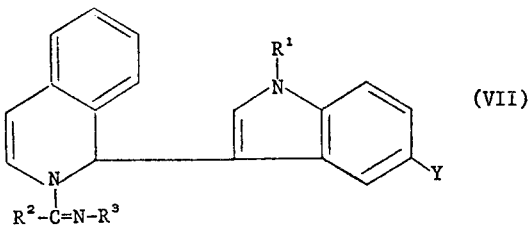

(VII)

indolyltetrahydrobenzoquinolines of the formula

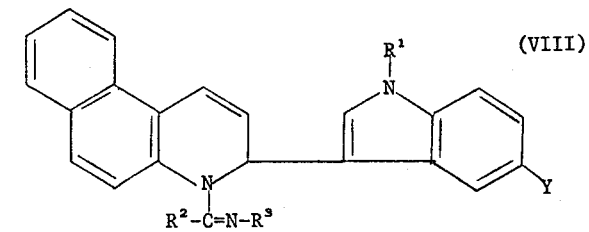

(VIII)

or alkylating said compounds of Formulas VI-XII wherein $R^1$ is hydrogen with an alkyl halide.

Illustrative of suitable carboxamide reactants which may be employed are: N-alkylformamides such as N-methylformamide, N-ethylformamide, N-n-propylformamide, N-isopropylformamide, N-n-butylformamide, N-tert.-butylformamide; suitable N-cycloalkylformamides such as N-cyclopropylformamide, N-cyclobutylformamide, N-cyclopentylformamide, N-cyclohexylformamide. Suitable cycliccarboxamides (i.e., lactams) include 2-pyrrolidinone, and alkyl substituted pyrrolidinones such as 5-methyl-2-pyrrolidinone, 5,5-dimethyl-2-pyrrolidinone, 3-methyl-2-pyrrolidinone, 4-methyl-2-pyrrolidinone, 5,5-di-n-butyl-2-pyrrolidinone and the like.

Suitable X-substituted indole reactants are: 5-methoxyindole, 5-ethoxyindole, 5-isopropoxyindole, 5-tert.-butoxyindole, 1-methylindole, 1-methyl-5-methoxyindole, 1-isopropyl-5-methoxyindole, and the like.

Suitable quinoline reactants are: 6-methoxyquinoline, 6-ethoxyquinoline, 6-isopropoxyquinoline, 6-n-butoxyquinoline, 6-isobutoxyquinoline, and the like. Suitable heterocyclic B radicals are:
1-pyrrolin-2-yl;
5-methyl-1-pyrrolin-2-yl;
5,5-dimethyl-1-pyrrolin-2-yl;
4-methyl-1-pyrrolin-2-yl;
3-methyl-1-pyrrolin-2-yl.

It is to be understood that by the terms "lower alkyl" and "lower alkoxy" as used hereinabove, it is meant the carbon chains which comprise these groups include both straight and branched chain carbon radicals of 1 to 4 carbon atoms inclusive. Exemplary of these carbon chains radicals are methyl, ethyl, propyl, isopropyl, 1-butyl, 1-methylpropyl, 2-methylpropyl, and tert.-butyl.

The compounds characterized by Formula I have basic properties and are converted to corresponding non-toxic pharmaceutically acceptable acid addition salts by admixture of the base with a selected acid in an inert organic solvent such as ethanol, benzene, ethyl acetate, ether, halogenated hydrocarbons, and the like. A preferred method of salt preparation is to treat the base with substantially one chemical equivalent to an acid such as hydrogen chloride in ethanol solution. The salt precipitates from the ethanolic solution upon chilling or the addition of ether. Both the free base and salt forms of the products of Formula I are useful for the purpose of the invention although salts are particularly preferred because of their increased water solubility.

It is to be understood that the term "pharmaceutically acceptable acid addition salts" as used herein is construed to mean a combination of a compound of the present invention with a relatively non-toxic inorganic or organic acid. Some examples of inorganic or organic acids which may be employed to provide a non-toxic pharmaceutically acceptable acid addition salt of compounds of Formula I are: sulfuric, phosphoric, hydrochloric, hydrobromic, hydroiodic, sulfamic, acetic, lactic, maleic, succinic, malic, fumaric, tartaric, citric, gluconic, glutaric, ascorbic, benzoic, cinnamic, isethionic, and related acids.

In carrying out the process of the invention for the preparation of compounds characterized by Formula I, a carboxamide, an indole, and a quinoline, isoquinoline, benzoquinoline or phenanthridine base are first mixed together in an inert aprotic solvent and phosphorus oxychloride then added. A preferred solvent for carrying out the process is benzene although other solvents are suitable such as 1,2-dichloroethane, chloroform, carbon tetrachloride, 1,1-dichloroethane, hexane and the like. A critical factor in carrying out the process is the addition of phosphorus oxychloride which is preferably added to the mixture of carboxamide, indole and base (e.g. quinoline) reactants. If the base, carboxamide, and phosphorus oxychloride are combined before introduction of the indole, little imidoyl product of Formula I is obtained. The addition of phosphorus oxychloride to the reaction mixture provides an exothermic reaction and external cooling can be employed to moderate the reaction if desired. This is not necessary for the successful completion of the reaction inasmuch as the formation of the indolyl derivatives takes place in a facile manner and normally does not require heating for the formation of the compounds of Formula I. It is generally preferred to carry out the addition of phosphorus oxychloride at a temperature in the range of about 25°–35°C. but the reaction may be carried out at a temperature of from about 0°C. to 100°C. When the phosphorus oxychloride is added to the reaction mixture, the addition is accompanied by the formation of a tacky precipitate which requires some means of efficient stirring. The duration of the reaction is generally not critical and at a temperature in the preferred range, the reaction is essentially complete after about 2–24 hr.

The products of Formula I are isolated from the reaction mixture either as the hydrochloride salt according to standard procedures or by neutralization to form the free base form of the compounds of Formula I.

A preferred method of obtaining the compounds of Formula I wherein $R^1$ is lower alkyl is "N-alkylation" of the corresponding indolyl derivative wherein $R^1$ is hydrogen with an alkyl halide such as methyl iodide. The alkylation process is preferably carried out in dimethylformamide employing sodium hydride to irreversibly form the necessary anion intermediate under mild conditions. Other base systems such as potassium tert.-butoxide in tert.-butanol provide mixtures of alkylated and non-alkylated products due to the reversibility of the anion system.

The compounds of the present invention are evaluated as diuretics according to the method of W. L. Lipschitz et al., J. Pharmacol. Expt. Therap., 79, 97 (1943). In this method, groups of 8 to 10 rats are fasted 18 hours prior to the experiment. A control group is hydrated orally with 25 ml. per kilogram of body weight of isotonic saline solution which is also the vehicle used for dosing the test compound. One control group received a dose of 960 mg./kg. of body weight of urea. The imidolyl derivatives of Formula I are orally administered to animals of other groups in doses ranging from 2.7 to 24 mg./kg. body weight. Immediately after treatment, the animals are placed in metabolism cages (two rats of the same group per cage) and maintained without food or water for 5 hours. The volume of urine excreted by each pair is determined after this period and the pooled urine is analyzed for sodium, potassium, and chloride ions. The results for the test compounds are expressed as ratios of the volume of urine or total quantities of electrolytes (i.e., sodium, potassium, and chloride) eliminated during the experimental period compared to the urea control group.

With respect to electrolytes, it is particularly important for a diuretic agent to produce an increase in sodium ion elimination compared to potassium ion. One of the disadvantages of diuretics such as hydrochlorothiazide is that excessive elimination of potassium ion is obtained with respect to sodium ion resulting in electrolyte imbalance and, as a consequence, adverse side effects are produced in some instances.

The Lipschitz test clearly indicates that substantial increases in urine flow and favorable sodium and chloride ion elimination with respect to potassium ion are obtained with the compounds of Formula I. Preferred compounds of the present invention are those which produce a volume of fluid excretion >2.25 times that of the urea control group. Particularly preferred compounds in this respect are:

1,2-dihydro-2-(3-indolyl)-1-(5,5-dimethyl-1-pyrrolin-2-yl)quinoline,
1,2-dihydro-2-(3-indolyl)-1-(1-pyrrolin-2-yl)quinoline,
1,2-dihydro-2-(3-indolyl)-1-(5-methyl-1-pyrrolin-2-yl)-quinoline,
1,2-dihydro-6-methoxy-2-(5-methoxy-3-indolyl)-1-(5-methyl-1-pyrrolin-2-yl)quinoline,
1,2-dihydro-2-(1-methyl-3-indolyl)-1-(5-methyl-1-pyrrolin-2-yl)quinoline,
1,2,3,4-tetrahydro-1-(5,5-dimethyl-1-pyrrolin-2-yl)-2-(3-indolyl)quinoline,
1,2,3,4-tetrahydro-2-(3-indolyl)-1-(5-methyl-1-pyrrolin-2-yl)quinoline,
1,2-dihydro-1-(3-indolyl)-2-(1-pyrrolin-2-yl)isoquinoline,
1,2-dihydro-1-(3-indolyl)-2-(5-methyl-1-pyrrolin-2-yl)-isoquinoline,
1-(5,5-dimethyl-1-pyrrolin-2-yl)-1,2,3,4-tetrahydro-2-(1-methyl-3-indolyl)quinoline.

Apart from diuretic activity, an indolyl derivative of this invention when present in an effective amount in the mammalian circulatory system has the added benefit of providing a protective antithrombogenic effect. To measure the antithrombogenic activity of the compounds of Formula I, a standard pharmacological test essentially described by Born, Nature, 194, 927 (1962) and O'Brian, J. Clin. Path., 15, 446 (1962) is carried out. This test is a nephelometric method in which the change in turbidity of a specimen of platelet rich blood plasma is measured on causation of platelet aggregation by addition of a thrombogenic inducing agent such as adenosine diphosphate, or collagen. The compounds of the present invention are effective antithronbogenic agents according to this test at concentrations in the order of about 3 to 200 mcg./0.5 ml. platelet rich plasma. In the intact animal, the antithrombogenic effect is readily observed by applying the above test to blood samples withdrawn prior to and after administration of a compound of the present invention.

While compounds of Formula I generally exhibit significant antithrombogenic activity, compounds which reduce the thrombogenic capacity of collagen or adenosine diphosphate induced platelet aggregation by 50 percent or more at concentrations of less than 15 mcg./0.5 ml. of platelet rich plasma are preferred and by way of example there can be mentioned:

1,2-dihydro-2-(3-indolyl)-1-(5,5-dimethyl-1-pyrrolin-2-yl)quinoline,
3,4-dihydro-4-(5,5-dimethyl-1-pyrrolin-2-yl)-3-(3-indoly)benzo[f]quinoline,
1,2-dihydro-2-(3-indolyl)-1-(1-pyrrolin-2-yl)quinoline,
1,2-dihydro-2-(3-indolyl)-6-methoxy-1-(5,5-dimethyl-1-pyrrolin-2-yl)quinoline,
1,2-dihydro-6-methoxy-2-(5-methoxy-3-indolyl)-1-(5-methyl-1-pyrrolin-2-yl)quinoline,
1-(5,5-dimethyl-1-pyrrolin-2-yl)-1,2-dihydro-6-methoxy-2-(5-methoxy-3-indolyl)quinoline,
1,2-dihydro-2-(1-methyl-3indolyl)-1-(5-methyl-1-pyrrolin-2-yl)quinoline,
1,2-dihydro-1-(3-indolyl)-2-(1-pyrrolin-2-yl)isoquinoline,
1,2-dihydro-1-(3-indolyl)-2-(5,5-dimethyl-1-pyrrolin-2 yl)isoquinoline,
1,2,3,4-tetrahydro-1-(3-indolyl)-2-(5,5-dimethyl-1-pyrrolin-2-yl)isoquinoline,
1,2,3,4-tetrahydro-1-(3-indolyl)-2-(5-methyl-1-pyrrolin-2-yl)isoquinoline,
1,2,3,4-tetrahydro-2-(3-indolyl)-1-(1-pyrrolin-2-yl)isoquinoline,
1,2,3,4-tetrahydro-2-(3-indolyl)-1-(5-methyl-1-pyrrolin-2-yl)quinoline,
1-(5,5-dimethyl-1-pyrrolin-2-yl)-1,2,3,4-tetrahydro-2 (3-indolyl)-6-methoxyquinoline,
1-(5,5-dimethyl-1-pyrrolin-2-yl)-1,2,3,4-tetrahydro-6-methoxy-2-(5-methoxy-3-indolyl)quinoline,
4-(5,5-dimethyl-1-pyrrolin-2-yl)-3,4-dihydro-3-(1-methyl-3-indolyl)benzo[f]quinoline,
4-(5,5-dimethyl-1-pyrrolin-2-yl)-1,2,3,4-tetrahydro-3-(3-indolyl)benzo[f]quinoline,
5,6-dihydro-6-(3-indolyl)-5-(1-pyrrolin-2-yl)phenanthridine.

Indolyl derivatives of Formula I and non-toxic pharmaceutically acceptable salts thereof may be administered to mammals by either the parenteral or oral route. Diuretic and antithrombogenic effects are obtained with a dose of the compounds of Formula I ranging from about 0.01 to 10 mg./kg. body weight. With respect to total daily dose, optimum diuretic and antithrombogenic effects are obtained by oral administration of the indolyl derivatives of Formula I in a non-toxic effective dose ranging from about 0.05 to 100 mg./kg. body weight. It is to be understood that the term "non-toxic effective dose" as used herein refers to the quantity of active ingredient necessary to produce the desired therapeutic effect without causing any harmful or deleterious side effects.

Oral toxicity values ($ALD_{50}$) of the substances of Formula I in mice range from about 250 to greater than 2000 mg./kg. of body weight. For example, the $ALD_{50}$ value for 1,2-dihydro-6-methoxy-2-(5-methoxy-3-indolyl)-1-(5-methyl-1-pyrrolin-2-yl)quinoline is 500 mg./kg. body weight.

The compounds of the present invention can be formulated according to conventional pharmaceutical practice to provide pharmaceutical compositions of unit dosage form which may include solid preparations suitable for oral administration such as tablets, capsules, powders, granules, emulsions, suspensions, and the like. The solid preparations may comprise an inorganic carrier, e.g., talc, or an organic carrier such as lactose or starch. Additives such as magnesium stearate (a lubricant) can also be included. Liquid preparations suitable for parenteral administration include solutions, suspensions, or emulsions of the compounds of Formula I in combination with the usual diluent such as water, petroleum jelly, and the like; a suspension media such as polyoxyethylene glycols, vegetable oils, and the like. The compositions may also contain other additional ingredients such as absorbing agents, stabilizing agents, weighting agents and buffers.

The following examples are given by way of illustration and are not to be construed as limitations of this invention, variations of which are possible without departing from the scope and spirit thereof.

EXAMPLE 1

A solution of phosphorus oxychloride (7.7 g., 0.05 mole) in 30 ml. of dry benzene is added drop-wise to a stirred solution of 6-methoxyquinoline (15.9 g., 0.05 mole), 5-methoxyindole (7.36 g., 0.05 mole) and 5-methyl-2-pyrrolidinone (4.96 g., 0.05 mole) in 30 ml. of dry benzene in about 15 min. A yellow solid precipitates and changes to a tar as the phosphorus oxychloride is added. Stirring is continued for a period of approximately 24 hr., the benzene supernatant decanted from the reaction tar, the reaction tar washed with water and then made basic with ammonium hydroxide. Extraction of the basified solution with benzene, filtering and concentrating under reduced pressure provides the indolyl derivative as the free base. Analytically pure 1,2-DIHYDRO-6-METHOXY-2-(5-METHOXY-3-INDOLYL)-1-(5-METHYL-1-PYRROLIN-2-YL)QUINOLINE is obtained by crystallization from ethanol, m.p. 144.5–147.5°C. (corr.).

Analysis—Calcd. for $C_{24}H_{25}N_3O_2$ (percent): C, 74.39; H, 6.50; N, 10.85. Found (percent): C, 74,57; H, 6.44; N, 10.78. NMR delta (ppm) (DMSO-$d_6$, TMS reference): 1.24d (6.5), 3.71s, 3.98m, 6.35dd (6.0, 9.0), 7.41m, 10.58bs.

EXAMPLE 2

Phosphorus oxychloride (7.7 g., 0.05 mole) in 20 ml. of benzene is added drop-wise to a stirred solution of indole (5.9 g., 0.05 mole), 15 ml. of quinoline and t-butylformamide (5.1 g., 0.05 mole) in 20 ml. of benzene. The reaction mixture is stirred overnight and the benzene supernatant decanted from a heavy oil which formed during the addition of the phosphorus oxychloride. The oil is first washed with water and then stirred with a minimal volume of acetone to form a solution. Further dilution of the solution with a two-fold volume of acetone and standing provides a precipitate of the indolylimidoyldihydroquinoline hydrochloride product. Crystallization from isopropanol-methanol affords analytically pure 1[(tert-BUTYLIMINO)METHYL]-1,2-DIHYDRO-2-(3-INDOLYL)QUINOLINE HYDROCHLORIDE, yield 1.0 g., m.p. 191.5°–192°C. (dec.) (corr.).

Analysis—Calcd. for $C_{22}H_{23}N_3$. HCl (percent): C, 72.24; H, 6.61; N, 11.48; Cl, 9.69. Found (percent): C, 72.13; H, 6,77; N, 11.56; Cl, 9.73.

NMR delta (ppm) (DMSO-$d_6$, TMS reference): 1.55s, 6.46dd (5.5, 9.5), 8.24d (14.5), 11.48bs, 11.49d (14.5).

EXAMPLE 3

Phosphorus oxychloride (7.7 g., 0.05 mole) is added to indole (5.9 g., 0.05 mole), 15 ml. of quinoline, isopropylformamide (4.4 g., 0.05 mole) in benzene according to the procedure of Example 2. The product which precipitates from acetone is crystallized from absolute ethanol yielding 2.6 g. of analytically pure 1,2-DIHYDRO-2-(3-INDOLYL)-1-[(ISOPROPYLIMINO)METHYL]QUINOLINE HYDROCHLORIDE, m.p. 187.5°–189°C. (dec.)(corr.).

Analysis—Calcd. for $C_{21}H_{21}N_3$ . HCl (percent): C, 71.68; H, 6.30; N, 11.94. Found (percent): C, 71.56; H, 6.32; N, 11.85.

NMR delta (ppm)(DMSO-$d_6$, TMS reference): 1.42d (6.6), 4.14m, 6.42dd (6.0, 8.5), 8.68d (13.5), 11.40bs, 11.50d (13.5).

EXAMPLE 4

Phosphorus oxychloride (30.7 g., 0.2 mole) is added to indole (23.4 g., 0.2 mole), 60 ml. of quinoline, 5-methyl-2-pyrrolidinone (19.8 g., 0.2 mole) in benzene according to the procedure of Example 1. The washed reaction tar is made basic with aqueous sodium hydroxide, extracted with chloroform and the chloroform extract filtered and concentrated. The residual oil is triturated with a 1:1 mixture of benzene-hexane to provide 30.5 g. of a solid which is collected and washed with benzene. The solid is extracted with hot benzene and the cooled extract filtered yielding analytically pure 1,2-DIHYDRO-2-(3-INDOLYL)-1-(5-METHYL-1-PYRROLIN-2-YL)QUINOLINE, m.p. 149.5°–152.5°C. (corr.).

Analysis—Calcd. for $C_{22}H_{21}N_3$ (percent): C, 80.70; H, 6.47; N, 12.83. Found (percent): C, 80.41; H, 6.26; N, 12.66.

NMR delta (ppm)(DMSO-$d_6$, TMS reference): 1.22d (6.6); 3.97m, 6.34dd (6.0, 9.2), 6.69d (9.2), 7.92m, 10.68bs.

EXAMPLE 5

Phosphorus oxychloride (8.1 g., 0.053 mole) is added to a mixture of 5-methoxyindole (7.75 g., 0.053 mole), 15.5 ml. of quinoline, cyclohexylformamide (6.7 g., 0.053 mole) in benzene according to the procedure of Example 2. The washed reaction tar is taken up in a minimal amount of acetone and, on standing, provides 3 g. of crude product. Crystallization of the crude product from absolute ethanol affords analytically pure 1-[(CYCLQHEXYLIMINO)METHYL]-1,2-DIHYDRO-2-(5-METHOXY-3-INDOLYL)-QUINOLINE HYDROCHLORIDE, m.p. 174°–177°C. (corr.).

Analysis—Calcd. for $C_{25}H_{27}N_3O$ . HCl (percent): C, 71.15: H, 6.69; N, 996. found (percent): C, 70,87; H, 6.67; N, 9.74.

NMR delta (ppm) (DMSO-$d_6$, TMS reference): 3.48s, 3.57m, 6.32dd (6. 0, 9. 0), 8.64d (14.0), 11.20bs, 11.40d (14.0).

EXAMPLE 6

Phosphorus oxychloride (15.4 g., 0.1 mole) is added to indole (11.8 g., 0.1 mole), 30 ml. (0.23 mole) of quinoline, 2-pyrrolidinone (8.6 g., 0.1 mole) in benzene according to the procedure of Example 1. The washed reaction tar is made basic with ammonium hydroxide, extracted with chloroform and the dried chloroform extract concentrated. The residual oil is stirred with dry benzene and filtered. The filter cake is extracted with hot benzene to provide upon cooling a 9.4 percent yield of analytically pure 1,2DIHYDRO-2-(3-INDOLYL)-1-(1-PYRROLIN-2-YL)QUINOLINE, m.p. 219.5°–220.5°C. (dec.)(corr.).

Analysis—Calcd. for $C_{21}H_{19}N_3$ (percent): C, 80.48; H, 6.11; N, 13.41. Found (percent): C, 80.50; H, 6.05; N, 13.25.

NMR delta (ppm) (DMSO-$d_6$, TMS reference): 3.61t, 6.21dd (6, 0, 9.0), 6.54d (9.0), 7.60m, 10.57bs.

EXAMPLE 7

Phosphorus oxychloride (7.7 g., 0.05 mole) is added to indole (5.9 g., 0.05 mole), 15 ml. of quinoline, 5,5-dimethylpyrrolidinone (5.7 g., 0.05 mole) in benzene according to the procedure of Example 1. The washed reaction tar is stirred with aqueous ammonium hydroxide and extracted first with benzene and then with chloroform. The extracts are dried, concentrated and the combined residue crystallized from benzene yielding analytically pure 1,2-DIHYDRO-2-(3-INDOLYL)-1-(5,5-DIMETHYL-1-PYRROLIN-2-YL)QUINOLINE, m.p. 244°–248.5°C. (dec.)(corr.).

Analysis—Calcd. for $C_{23}H_{23}N_3$ (percent): C, 80.90; H, 6,79; N, 12.31. Found (percent): C, 80.96; H, 6.65; N, 12.34.

NMR delta (ppm) (CDCl$_3$, TMS reference): 1.35s, 1.82m, 6.25dd (5. 5, 9. 5,), 6.62d (9.5), 7.98m, 8.07bs.

EXAMPLE 8

Phosphorus oxychloride (7.7 g., 0.05 mole) is added to a mixture of indole (5.9 g., 0.25 mole), 6-methoxyquinoline (15.9 g., 0.10 mole), 5,5-dimethyl-2-pyrrolidinone (5.7 g., 0.05 mole) in benzene according to the procedure of Example 2. The washed reaction tar is stirred with acetone providing an off-white solid (8.45 g.). This material is stirred with water and made basic with ammonium hydroxide. The basified mixture is extracted first with benzene and then with chloroform. Concentration of the combined extracts provides the crude free base which is crystallized from isopropyl ether, m.p. 97.5°–99.5°C. The free base is taken up in ethanol and treated with ethanolic hydrogen chloride to provide the hydrochloride of the product. Analytically pure 1,2-DIHYDRO-2-(3-INDOLYL)-6-METHOXY-1-(5,5-DIMETHYL-1-PYRROLIN-2-YL)QUINOLINE HYDROCHLORIDE is obtained by crystallization from ethanol, m.p. 219°–221°C. (corr.).

Analysis—Calcd. for $C_{24}H_{25}N_3$. HCl (percent): C, 70.66; H, 6.43; N, 10.30; Cl, 8.69. Found (percent): C, 70.67; H, 6.56; N, 10.10; Cl, 8.40.

NMR delta (ppm) (DMSO-d$_6$, TMS reference): 1.51s, 3.79s, 11.25bs, 11.77bs.

EXAMPLE 9

Phosphorus oxychloride (8.17 g., 0.05 mole) is added to a mixture of 5-methoxyindole (7.36 g., 0.05 mole), 6-methoxyquinoline (15.9 g., 0.1 mole), 5,5-dimethyl-2-pyrrolidinone (5.7 g., 0.05 mole) in benzene according to the procedure of Example 2. The washed reaction tar is stirred with acetone providing a 36.5 percent yield of analytically pure 1-(5,5-DIMETHYL-1-PYRROLIN-2-YL)-1,2-DIHYDRO-6Methoxy-2-(5-METHOXY-3-INDOLYL)-QUINOLINE HYDROCHLORIDE, m.p. 200°–203.5°C. (dec.)(corr.).

Analysis—Calcd. for $C_{25}H_{27}N_3O_2$. HCl (percent): C, 68.56; H, 6.44; N, 9.59; Cl, 8.10. Found (percent): C, 68.29; H, 6.52; N, 9.33; Cl, 7.97.

NMR delta (ppm)(DMSO-d$_6$, TMS reference): 1.52s, 2.02m, 3.68s, 3.73m, 3.80s, 10.93bs, 11.85bs.

EXAMPLE 10

Phosphorus oxychloride, 6-isopropoxyquinoline, 5-methoxyindole and 5-methyl-2-pyrrolidinone reacted according to the procedure of Example 1 provides 1,2-DIHYDRO-6-ISOPROPOXY-2-(5-METHOXY-3-INDOLYL)-1-(5-METHYL-1-PYRROLIN-2-YL)QUINOLINE.

EXAMPLE 11

The dihydroquinoline 1-(5,5-dimethyl-1-pyrrolin-2-yl)-1,2-dihydro-6-methoxy-2-(5-methoxy-3-indolyl)quinoline hydrochloride (1.54 g., 0.035 mole) in 200 ml. of absolute ethanol containing 1 ml. of ethanolic hydrogen chloride is hydrogenated on a Parr apparatus employing 0.2 g., of platinum oxide catalyst. When hydrogen is no longer taken up, the catalyst is collected, the filtrate concentrated under reduced pressure and the residue thus obtained crystallized from acetone profiding a 65 percent yield of analytically pure 1-(5,5-DIMETHYL-1-PYRROLIN-2-YL)-1,2,3,4-TETRAHYDRO-6-METHOXY-2-(5-METHOXY-3-INDOLYL)QUINOLINE HYDROCHLORIDE, m.p. 226.5°–229.5°C. (corr.).

Analysis—Calcd. for $C_{25}H_{29}N_3O_2$. HCl (percent): C, 68.24; H, 6.87; N, 9.55; Cl, 8.06. Found (percent): C, 68.28; H, 6.77; N, 9.42; Cl, 8.02.

NMR delta (ppm)(DMSO-d$_6$, TMS reference): 1.40s, 1.48s, 3.58s, 3.80s, 5.98m, 10.68bs, 10.85bs.

EXAMPLE 12

Reduction of 1,2-dihydro-6-methoxy-2-(5-methoxy-3-indolyl)-1-(5-methyl-1-pyrrolin-2-yl)quinoline according to the procedure of Example 11 provides 1,2,3,4-tetrahydro-6-methoxy-2-(5-methoxy-3-indolyl)-1-(5-methyl-1-pyrrolin-2-yl)quinoline hydrochloride. The hydrochloride is converted to the free base with ammonium hydroxide, extracted with chloroform and chloroform extract concentrated under reduced pressure. Crystallization of the residual solid thus obtained from benzene affords analytically pure 1,2,3,4-TETRAHYDRO-6-METHOXY-2-(5-METHOXY-3-INDOLYL)-1-(5-METHYL-1-PYRROLIN-2-YL)QUINOLINE, m.p. 195°–196°C. (corr.).

Analysis—Calcd. for $C_{24}H_{27}N_3O_2$ (percent): C, 74.01; H, 6.99; N, 10.79. Found (percent): C, 74.27: H, 6,82; N, 10.69.

NMR delta (ppm) (DMSO-d$_6$, TMS reference): 1.13d (6.5), 1.20d (6.5), 3.70s, 5.97m, 10.63bs.

EXAMPLE 13

Reduction of 1,2-dihydro-2-(3-indolyl)-1-(5.5-dimethyl 1-pyrrolin-2-yl)quinoline according to the procedure of Example 11 affords 1-(5,5-DIMETHYL-1-PYRROLIN-2-YL)-1,2,3,4-TETRAHYDRO-2-(3-INDOLYL)QUINOLINE HYDROCHLORIDE, m.p. 217°–219.5°C. (dec.)(corr.), from isopropyl alcohol-isopropyl ether.

Analysis—Calcd. for $C_{23}H_{25}N_3$. HCl (percent): C, 72.71; H, 6.90; N, 11.06; Cl, 9.33. Found (percent): C, 72.71; H, 6,76; N, 10.93; Cl, 9.68.

NMR delta (ppm) (DMSO-d$_6$, TMS reference): 1.37s, 143s, 5.86m, 6.78s, 10.83bs, 11.13bs.

EXAMPLE 14

Reduction of 1,2-dihydro-2-(3-indolyl)-6-methoxy-1-(5,5-dimethyl-1-pyrrolin-2-yl)quinoline hydrochloride according to the procedure of Example 11 affords 1-(5,5-DIMETHYL-1-PYRROLIN-2-YL)-1,2,3,4-TETRAHYDRO-2-(3-INDOLYL)-6-METHOXYQUINOLINE HYDROCHLORIDE, m.p. 229.5°–234.5°C. (corr.) (from acetone).

Analysis—Calcd. for $C_{24}H_{27}N_3O$ . HCl (percent): C, 70.31; H, 6.88; N, 10.25; Cl, 8.65. Found (percent): C, 70.41; H, 6.91; N, 10.03; Cl, 8.58.

NMR delta (ppm) (DMSO-d$_6$, TMS reference): 1.40s, 1.44s, 3.79s, 5.96m, 10.48bs, 10.98bs.

EXAMPLE 15

Reduction of 1,2-dihydro-2-(3-indolyl)-1-(5-methyl-1-pyrrolin-2-yl)quinoline according to the procedure of Example 11 affords 1,2,3,4-TETRAHYDRO-2-(3-INDOLYL)-1-(5-METHYL-1-PYRROLIN-2-YL)QUINOLINE HYDROCHLORIDE, m.p. 295.5°–296.5°C. (dec). (corr.), from isopropyl alcohol-isopropyl ether.

Analysis—Calcd. for $C_{22}H_{23}N_3$.HCl (percent): C, 72.21; H, 6.61; N, 11.48; Cl, 9.69. Found (percent): C, 71.92; H, 6.66; N, 11.43; Cl, 9.72.

NMR delta (ppm) (DMSO-d$_6$, TMS reference): 1.30d (6.5), 4.20m, 5.91m, 6.90s, 8.38m, 10.95bs, 11.32bs.

EXAMPLE 16

Reduction of 1,2-dihydro-2-(3-indolyl)-1-(1-pyrrolin-2-yl)quinoline according to the procedure of Example 11 affords 1,2,3,4-TETRAHYDRO-2-(3-INDOLYL)-1-(1-PYRROLIN-2-YL)-QUINOLINE HYDROCHLORIDE, m.p. 228°–229°C. (corr.), from ethanol.

Analysis—Calcd. for $C_{21}H_{21}N_3$.HCl (percent): C, 71.68; H, 6.30; N, 11.94; Cl, 10.08. Found (percent): C, 71.55; H, 6.33; N, 11.78; Cl, 9.86.

NMR delta (ppm) (DMSO-d$_6$, TMS reference): 5.89m, 6.95s, 10.62bs, 11.23bs.

EXAMPLE 17

Reduction of 1,2-dihydro-2-(3-indolyl)-1[(isopropylimino)methyl]quinoline hydrochloride according to the procedure of Example 11 affords 1,2,3,-4-TETRAHYDRO-2-(3-INDOLYL)-1-[ISOPROPYLIMINO)METHYL]QUINOLINE HYDROCHLORIDE, m.p. 200.5°–201.5°C. (corr.) (from ethanol).

Analysis—Calcd. for $C_{21}H_{23}N_3 \cdot HCl$ (percent): C, 71.27; H, 6.84; N, 11.87; Cl, 10.02. Found (percent): C, 71.16; H, 6.84; N, 11.68; Cl, 10.02.

NMR delta (ppm)(DMSO-$D_6$, TMS reference): 1.25d (6.5), 1.32d (6.5), 4.17m, 6.10m, 8.36m, 10.17bs, 10.92bs.

EXAMPLE 18

Reduction of the indolylimidoyldihydroquinolines:
1-[(cyclohexyllmino)methyl]-1,2-dihydro-2-(5-methoxy-3-indolyl)quinoline hydrochloride,
1-[(tert.-butylimino)methyl]-1,2-dihydro-2-(3-indolyl)quinoline hydrochloride,
1,2-dihydro-6-isopropoxy-2-(5-methoxy-3-indolyl)-1-(5-methyl-1-pyrrolin-2-yl)quinoline
according to the procedure of Example 11 provides the respective indolylimidoyltetrahydroquinolines:
1-[(CYCLOHEXYLIMINO)METHYL]-1,2,3,4-TETRAHYDRO-2-(5-METHOXY-3-INDOLYL)QUINOLINE HYDROCHLORIDE,
1-[(tert.-BUTYLIMINO)METHYL]-1,2,3,4-TETRAHYDRO-2-(3-INDOLYL)QUINOLINE HYDROCHLORIDE,
1,2,3,4-TETRAHYDRO-6-ISOPROPOXY-2-(5-METHOXY-3-INDOLYL)-1-(5-METHYL-1-PYRROLIN-2-YL)QUINOLINE HYDROCHLORIDE.

EXAMPLE 19

Phosphorus oxychloride (7.7 g., 0.05 mole) is added to a mixture of indole (5.9 g., 0.05 mole), 15 ml. of isoquinoline, isopropylformamide (4.4 g., 0.05 mole) in benzene according to the procedure of Example 1. The washed reaction tar is taken up in a minimal amount of isopropyl alcohol and quenched in ice water providing a solid which is collected and washed with warm acetone. The partially purified indolylimidoyldihydroisoquinoline hydrochloride is converted to the free base with ammonium hydroxide and taken up in benzene. Addition of hexane to the benzene extract provides analytically pure 1,2-DIHYDRO-1-(3-INDOLYL)-2-[(ISOPROPYLILMINO)METHYL]ISOQUINOLINE in a yield of 17 percent, m.p. 144°–145.5°C. (corr.).

Analysis—Calcd. for $C_{21}H_{21}N_3$ (percent): C, 79.96; H, 6.71; N, 13.32. Found (percent): C, 79.94; H, 6.67; N, 13.07.

NMR delta (ppm)($CDCl_3$, TMS reference): 1.16d (6.5), 1.23d (6.5), 3.38m, 5.83d (7.6), 6.52dd (7.6, <1), 7.57s, 7.93m, 8.02bs.

EXAMPLE 20

Phosphorus oxychloride (8.2 g., 0.05 mole) is added to a mixture of indole (5.86 g., 0.05 mole), isoquinoline (12.92 g., 0.10 mole), 2-pyrrolidinone (4.26 g., 0.05 mole) in benzene according to the procedure of Example 1. The washed reaction tar is made basic with ammonium hydroxide, and the crude free base isolated by extracting with benzene. Concentration of the benzene extract and crystallization of the residue from isopropyl ether affords analytically pure 1,2-DIHYDRO-1-(3-INDOLYL)-2-(1-PYRROLIN-2-YL)ISOQUINOLINE, m.p. 160.0°–162.5°C. (corr.).

Analysis—Calcd. for $C_{21}H_{19}N_3$ (percent); C, 80.48; H, 6.11; N, 13.41. Found (percent): C, 80.76; H, 6.30; N, 13.42.

NMR delta (ppm)(DMSO-$d_6$, TMS reference): 3.67t, 5.89d (7.6), 6.87dd (7.6, <1), 7.78m, 10.80bs.

EXAMPLE 21

Phosphorus oxychloride (8.7 g., 0.05 mole) is added to a mixture of indole (5.86 g., 0.05 mole), isoquinoline (12.92 g., 0.10 mole, 5-methyl-2-pyrrolidinone (4.96 g., 0.05 mole) in benzene according to the procedure of Example 1. The reaction tar is made basic with ammonium hydroxide and the free base isolated by extracting first with benzene and then with chloroform. The combined extracts are concentrated, and the residue stirred with hot isopropyl ether and filtered. On standing, the filtrate provides a solid which is crystallized from benzene, affording analytically pure 1,2-DIHYDRO-1-(3-INDOLYL)-2-(5-METHYL-1-PYRROLIN-2-YL)ISOQUINOLINE, m.p. 152.5°–156.5°C. (dec.)(corr.)

Analysis—Calcd. for $C_{22}H_{21}N_3$ (percent): C, 80.70: H, 6.47; N, 12.83. Found (percent): C, 80.41; H, 6.46; N, 12.61.

NMR delta (ppm)($CDCl_3$, TMS reference): 1.27d (6.0), 1.37d (6.0), 4.18m, 5.88d (7.6), 6.53d (7.6), 6.59d (7.6), 8.06m, 8.14bs.

EXAMPLE 22

Phosphorus oxychloride (7.7 g., 0.05 mole) is added to a mixture of indole (5.86 g., 0.05 mole), isoquinoline (12.92 g., 0.10 mole), 5,5-dimethyl-2-pyrrolidinone (5.7 g., 0.05 mole) in benzene according to the procedure of Example 1. The crude free base isolated according to the procedure of Example 2 is purified by first crystallizing from acetone and then from benzene to provide a 65 percent yield of analytically pure 1,2-DIHYDRO-1-(3-INDOLYL)-2-(5,5-DIMETHYL-1-PYRROLIN-2-YL)ISOQUINOLINE, m.p. 191.5°–192°C. (corr.).

Analysis—Calcd. for $C_{23}H_{23}N_3$ (percent): C, 80.90; H, 6.79; N, 12.31. Found (percent): C, 80.96; H, 6.68; N, 12.38.

NMR delta (ppm)(DMSO-$d_6$, TMS reference): 1.19s, 1.25s, 5.94d (7.6), 7.9m.

EXAMPLE 23

Phosphorus oxychloride, 5-methoxyindole, isoquinoline and 5-methyl-2-pyrrolidinone reacted according to the procedure of Example 1 provides 1,2-DIHYDRO-1-(5-METHOXY-3-INDOLYL)-2-(5-METHYL-1-PYRROLIN-2-YL)ISOQUINOLINE.

By substituting 5,5-dimethylpyrrolidinone and pyrrolidinone respectively for 5-methylpyrrolidinone in the above example there is obtained 1,2-DIHYDRO-1-(5-METHOXY-3-INDOLYL)-2-(5,5-DIMETHYL-1-PYRROLIN-2-YL)ISOQUINOLINE and 1,2-DIHYDRO-1-(5-METHOXY-3-INDOLYL)-2-(1-PYRROLIN-2-YL)ISOQUINOLINE.

EXAMPLE 24

Reduction of 1,2-dihydro-1-(3-indolyl)-2-(1-pyrrolin-2yl)isoquinoline according to the procedure of Example 11 affords 1,2,3,4-TETRAHYDRO-1-(3-INDOLYL)-2-(1PYRROLIN-2-YL)ISOQUINOLINE HYDROCHLORIDE, m.p. 271.5°–274°C. (dec.) (corr.), from ethanol.

Analysis—Calcd. for $C_{21}H_{21}N_3 \cdot HCl$ (percent): C, 71.68; H, 6.30; N, 11.94; Cl, 10.08. Found (percent): C, 71.70; H, 6.29; N, 11.86; Cl, 10.27. NMR delta (ppm)(DMSO-d$_6$, TMS reference): No distinguishable peaks-complex multiplets.

EXAMPLE 25

Reduction of 1,2-dihydro-1-(3-indolyl)-2-(5-methyl-1-pyrrolin-2-yl)isoquinoline according to the procedure of Example 11, affords the indolylimidoyltetrahydroisoquinoline hydrochloride product which is purified as the free base to provide analytically pure 1,2,3,4-TETRAHYDRO-1-(3-INDOLYL)-2-(5-METHYL-1-PYRROLIN-2-YL)-ISOQUINOLINE, m.p. 176°–177°C. (corr.) from benzene.

Analysis—Calcd. for $C_{22}H_{23}N_3$ (percent): C, 80.21; H, 7.04; N, 12.75. Found (percent): C, 80.49; H, 6.90: N, 12.63. NMR delta (ppm)(CDCl$_3$, TMS reference): 1.22d (6.5), 1.30d (6.5), 6.55s, 8.88s.

EXAMPLE 26

Reduction of 1,2-dihydro-1-(3-indolyl)-2-(5,5-dimethyl-1-pyrrolin-2-yl)isoquinoline according to the procedure of Example 11 affords 1,2,3,4-TETRAHYDRO-1-(3-INDOLYL)-2-(5,5-DIMETHYL-1-PYRROLIN-2YL)ISOQUINOLINE HYDROCHLORIDE, m.p. 281.5°–283.5°C. (dec.) (corr.), from isopropyl alcohol.

Analysis—Calcd. for $C_{23}H_{25}N_3$.HCl (percent): C, 72.71; H, 6.90; N, 11.06; Cl, 9.33. Found (percent): C, 72.60; H, 6.80; N, 10.84; Cl, 9.48.

NMR delta (ppm)(DMSO-d$_6$, TMS reference): 1.36s, 1.44s, 1.45s, 1.48s, 10.6bs, 11.27bs, 11.37bs.

EXAMPLE 27

Reduction of the indolylimidolydihydroisoquinolines:

1,2-dihydro-1-(3-indolyl)-2-[(isopropylimino)methyl]-isoquinoline,
1,2-dihydro-1-(5-methoxy-3-indolyl)-2-(5,5-dimethyl-1-pyrrolin-2-yl)isoquinoline,
1,2-dihydro-1-(5-methoxy-3-indolyl)-2-(1-pyrrolin-2-yl)-isoquinoline,
1,2-dihydro-1-(5-methoxy-3-indolyl)-2-(5-methylpyrrolidinone according to the procedure of Example 11 provides the respective indolylimidoyltetrahydroisoquinolines:

1,2,3,4-TETRAHYDRO-1-(3-INDOLYL)-2[(ISOPROPYLIMINO)METHYL[-ISOQUINOLINE HYDROCHLORIDE,
1,2,3,4-TETRAHYDRO-1-(5-METHOXY3-INDOLYL)2-(5,5-DIMETHYL-1PYRROLIN-2-YL)ISOQUINOLINE HYDROCHLORIDE,
1,2,3,4-TETRAHYDRO-1(5-METHOXY-3-INDOLYL)-2-(1-PYRROLIN-2-YL)ISOQUINOLINE HYDROCHLORIDE,
1,2,3,4-TETRAHYDRO-1(5METHOXY-3-INDOLYL)-2-(5-METHYL-1-PYRROLIN-2-YL)ISOOQUINOLINE HYDROCHLORIDE.

EXAMPLE 28

Phosphorus oxychloride, 5,6-benzoquinoline, indole, and 5,5-dimethyl-2-pyrrolidinone are reacted according to the procedure of Example 2. The crude free base isolated by adding ammonium hydroxide to the reaction tar and extracting with chloroform is stirred with refluxing hexane and filtered. The filter cake is stirred with hot isopropyl ether and filtered. The cooled filtrate provides the free base which is converted to the hydrochloride salt by treatment with ethanolic hydrogen chloride in ethanol affording analytically pure 3,4-DIHYDRO-4(5,5-DIMETHYL-1-PYRROLIN-2-YL)-3-(3-INDOLYL)BENZO[f]QUINOLINE HYDROCHLORIDE, m.p. 222°–223°C. (corr.).

Analysis—Calcd. for $C_{27}H_{25}N_3$.HCl (percent): C, 75.77; H, 6.12; N, 9.82; Cl, 8.29. Found (percent): C, 75.59; H, 6.14; N, 9.63; Cl, 8.10.

NMR delta (ppm)(DMSO-d$_6$, TMS reference): 1.48s, 2.07m, 8.28m, 11.05bs, 11.83bs.

EXAMPLE 29

Reaction of 5,6-benzoquinoline, isopropyl formamide and indole according to the procedure of Example 28 provides
3,4-DIHYDRO-4-[(ISOPROPYLIMINO)METHYL]-3-(3-INDOLYL)-BENZO[f]QUINOLINE HYDROCHLORIDE, Reaction of 5,6-benzoquinoline, 5,5-dimethyl-2-pyrrolidinone, and 5-methoxyindole according to the procedure of Example 28 provides
4-(5,5-DIMETHYL-1-PYRROLIN-2-YL)-3,4-DIHYDRO-3-(5METHOXY-3-INDOLYL)BENZO[f]QUINOLINE HYDROCHLORIDE.

Reaction of 5,6-benzoquinoline, 2-pyrrolidinone and 5-isopropoxyindole according to the procedure of Example 28 provides
3,4-DIHYDRO-3-(5-ISOPROPOXYINDOLE)-4-(1PYRROLIN-2YL)-BENZO[f]QUINOLINE HYDROCHLORIDE.

EXAMPLE 30

Reduction of 3,4-dihydro-4-(5,5-dimethyl-1-pyrrolin-2-yl)-3-(3-indolyl)benzo[f]quinoline hydrochloride according to the procedure of Example 11 affords 4-(5,5-DIMETHYL-1PYRROLIN-2-YL)1,2,3,4-TETRAHYDRO-3(3-INDOLYL)BENZO[f]QUINOLINE HYDROCHLORIDE, m.p. 246.0°–251.0°C. (corr.) (from acetone).

Analysis—Calcd. for $C_{27}H_{27}N_3$.HCl (percent): C, 75.42; H, 6.56; N, 9.77; Cl, 8.25. Found (percent): C, 75.32; H, 6.78; N, 9.55; Cl, 8.46.

NMR delta (ppm) (CF$_3$CO$_2$H, TMS reference): 1.38s, 1.54s, 5.67m.

EXAMPLE 31

Reduction of the indolylimidolydihydrobenzoquinolines:

3,4-dihydro-4-[(isopropylimino)methyl]-3-(3-indolyl)-benzo[f]quinoline hydrochloride,
3,4-dihydro-5-(5,5-dimethyl-1-pyrrolin-2-yl)-3-(5-methoxy3-indolyl)benzo[f]quinoline hydrochloride,
3,4-dihydro-3-(5-isopropoxyindole)-4-(1-pyrrolin-2-yl)-benzo[f]quinoline hydrochloride, according to the procedure of Example 11 provides the respective indolylimidolytetrahydrobenzoquinolines:

1,2,3,4-TETRAHYDRO-4[(ISOPROPYLIMINO)METHYL]-3-(3-INDOLYL)BENZO[f]QUINOLINE HYDROCHLORIDE,
4(5,5-DIMETHYL-1-PYRROLIN-2YL)-1,2,3,4-TETRAHYDRO-3-(5-METHOXY-3INDOLYL)-BENZO[f]QUINOLINE HYDROCHLORIDE,
1,2,3,4-TETRAHYDRO-3-(5-ISOPROPOXYINDOLE)-4-(1-PYRROLIN-2-YL)BENZO[f]QUINOLINE HYDROCHLORIDE.

EXAMPLE 32

Phosphorus oxychloride (7.7 g., 0.05 mole) is added to indole (5.9g., 0.05 mole), phenanthridine (8.9 g., 0.05 mole), 2-pyrrolidinone (4.3 g., 0.05 mole) and triethylamine (5.1 g., 0.05 mole) in 60 ml. of dry benzene according to the procedure of Example 1. The washed reaction tar is stirred with isopropyl alcohol providing a solid which is collected. The crude hydrochloride salt is converted to the free base in chloroform by addition of ammonium hydroxide. Concentration of the chloroform extract and crystallization of the residual oil from benzene, followed by crystallization with isopropyl ether provides the isopropyl ether solvated product 5,-6-DIHYDRO-6-(3-INDOLYL)-5-(1-PYRROLIN-2-YL)PHENANTHRIDINE HEMIISOPROPYL ETHERATE, m.p. 119.5°–128.5°C. (dec.)(corr.).

Analysis—Calcd. for $C_{25}H_{21}N_3 \cdot 1/2C_6H_{14}O$ (percent): C, 81.11; H, 6.82; N, 10.14. Found (percent): C, 80.69; H, 6.91; N, 9.98.

NMR delta (ppm) (DMSO-$d_6$, TMS reference): 1.02d (6.1), 6.11d (2.6), 10.58bs.

EXAMPLE 33

Reaction of phosphorus oxychloride, indole, phenanthridine and isopropylformamide according to the procedure of Example 1 provides 5,6-DIHYDRO-6-(3-INDOLYL)-[5-(ISOPROPYLIMINO)-METHYL]-PHENANTHRIDINE.

Reaction of phosphorus oxychloride, 5-methoxyindole, phenanthridine and 2-pyrrolidinone according to the procedure of Example 1 provides 5,6-DIHYDRO-6-(5-METHOXY-3-INDOLYL)-5-(1-PYRROLIN-2-YL)PHENANTHRIDINE.

Reaction of phosphorus oxychloride, indole, phenanthridine and 5,5-dimethyl-2-pyrrolidinone according to the procedure of Example 1 provides 5,6-DIHYDRO-6-(3-INDOLYL)-5-(5,5-DIMETHYL-1-PYRROLIN-2-YL)PHENANTHRIDINE.

EXAMPLE 34

Sodium hydride (57 percent mineral oil dispersion, 0.7 g., 0.015 mole) is added in portions to a solution of 1,2-dihydro-1-(3-indolyl)-2-(1-pyrrolin-2-yl)isoquinoline (4.6 g., 0.015 mole) dissolved in 110 ml. of dry (molecular sieve) dimethylformamide under an atmosphere of nitrogen with stirring. After stirring the mixture for 3 hr., methyl iodide (2.1 g., 0.015 mole) in 15 ml. of dry dimethylformamide is added drop-wise and the mixture stirred for an additional period of 24 hr. The reaction mixture is filtered and the filtrate quenched in 300 ml. of ice water and the precipitated solid formed is collected and dried. Crystallization of the product from ethyl acetate affords analytically pure 1,2-DIHYDRO-1-(1-METHYL-3-INDOLYL)-2-(1-PYRROLIN-2-YL)ISOQUINOLINE, m.p. 186°–189°C. (corr.), in a 65 percent yield.

Analysis—Calcd. for $C_{22}H_{21}N_3$ (percent): C, 80.70; H, 6.47; N, 12.83. Found (percent): C, 80.89; H, 6.21; N, 12.71.

NMR delta (ppm) (CDCl$_3$, TMS reference): 1.98septet (7.5), 2.60t (7.5), 3.61s, 3.88t (7.5), 5.89d (7.6), 6.62dd (7.6, 1.2), 7.94m.

EXAMPLE 35

Alkylation of 1,2-dihydro-1-(3-indolyl)-2-[(isopropylimino)methyl]isoquinoline (6.31 g., 0.02 mole) with methyl iodide (5.68 g., 0.04 mole) employing sodium hydride (57 percent oil dispersion, 0.93 g., 0.02 mole) according to the procedure of Example 34 affords 1,2-DIHYDRO-2-[(ISOPROPYLIMINO)METHYL]-1-(1-METHYL-3-INDOLYL)ISOQUINOLINE, m.p. 115.5–116.5°C. (corr.) (from isopropyl alcohol).

Analysis—Calcd. for $C_{22}H_{23}N_3$ (percent): C, 80.21; H, 7.04; N, 12.75. Found (percent): C, 80.26; H, 7.00; N, 12.70.

NMR (ppm) CDCl$_3$, TMS reference): 1.15d (6.1), 1.22d (6.1), 3.46m, 3.55s, 5.76d (7.6), 6.43dd (7.6, <1), 7.49s, 7.87m.

EXAMPLE 36

Alkylation of the indolylimidoyldihydroisoquinolines:

1,2-dihydro-1-(3-indolyl)-2-(5-methyl-1-pyrrolin-2-yl)-isoquinoline,
1,2-dihydro-1-(3-indolyl)-2-(5,5-dimethyl-1-pyrrolin-2-yl)isoquinoline,
1,2-dihydro-1-(5-methoxy-3-indolyl)-2-(5-methyl-1-pyrrolin-2-yl)isoquinoline,
1,2-dihydro-1-(5-methoxy-3-indolyl)-2-(5,5-dimethyl-1-pyrrolin-2-yl)isoquinoline,
1,2-dihydro-1(5-methoxy-3-indolyl)-2-(1-pyrrolin-2-yl)isoquinoline with methyl iodide employing sodium hydride in dimethylformamide according to the procedure of Example 34 provides the respective N-methylindolylimidoyldihydroisoquinolines:

1,2-DIHYDRO-1-(1METHYL-3-INDOLYL)-2-(5-METHYL-1-PYRROLIN-2-YL)ISOQUINOLINE,
1,2-DIHYDRO-1(1-METHYL-3-INDOLYL)-2-(5,5-DIMETHYL-1-PYRROLIN-2-YL)ISOQUINOLINE,
1,2-DIHYDRO-1(1-METHYL-5-METHOXY-3-INDOLYL)-2-(5-METHYL-1PYRROLIN-2-YL)ISOQUINOLINE,
1,2-DIHYDRO-1-(1-METHYL-5-METHOXY-3-INDOLYL)-2-(5,5-DIMETHYL-1-PYRROLIN-1-PYRROLIN-2-YL)ISOQUINOLINE,
1,2DIHYDRO-1-(1-METHYL-5-METHOXY-3-INDOLYL)-2-(1-PYRROLIN-2-YL)ISOQUINOLINE.

Additional N-alkylindolylimidoyldihydroisoquinolines are obtained by substituting alkyl halides for methyl iodide. For instance, alkylation of 1,2-dihydro-1-(3-indolyl)-2-(5-methyl-1-pyrrolin-2-yl)isoquinoline with isopropyl bromide provides 1,2-DIHYDRO-1-(1-ISOPROPYL-3-INDOLYL)-2-(5-METHYL-1-PYRROLIN-2-YL)ISOQUINOLINE.

EXAMPLE 37

Alkylation of 1,2-dihydro-2-(3-indolyl)-1-[(isopropylimino)methyl]quinoline hydrochloride (1.36 g., 0.0039 mole) with methyl iodide (1.11 g., 0.0078 mole) employing sodium hydride (57 percent oil dispersion, 0.37 g., 0.0078 mole) according to the procedure of Example 34 affords a 67 percent yield of analytically pure 1,2-DIHYDRO-1-[(ISOPROPYLIMINO)METHYL]-2-(1-METHYL-3-INDOLYL)QUINOLINE, m.p. 133.5°–135.5°C. (corr.) (from hexane).

Analysis—Calcd. for $C_{22}H_{23}N_3$ (percent): C, 80.21; H, 7.04; N, 12.75. Found (percent): C, 79.92; H, 6.97; N, 12.69.

NMR delta (ppm) ($CDCl_3$, TMS reference): 1.23d (6.5), 1.30d (6.5), 3.51m, 3.60s, 6.18dd (9.5, 6.0), 8.06s, 8.14m.

EXAMPLE 38

Reaction of 1-methylindole, 5-methyl-2-pyrrolidinone, quinoline and phosphorus oxychloride according to the procedure of Example 1 provides 1,2-DIHYDRO-2-(1METHYL-3-INDOLYL)-1-(5-METHYL-1-PYRROLIN-2-YL)QUINOLINE, m.p. 175.3°–177.2°C. (corr.) (from ethanol).

Analysis—Calcd. for $C_{23}H_{23}N_3$ (percent): C, 80.90; H, 6.79; N, 12.31. Found (percent): C, 80.75; H, 6.64; N, 12.48.

NMR delta (ppm) ($CDDl_3$, TMS reference): 1.33d (6.5), 3.54s, 4.10m, 6.34dd (6.0, 9.5), 7.91m.

EXAMPLE 39

Alkylation of the indolylimidoyldihydroquinolines:
1,2-dihydro-6-methoxy-2-(5-methoxy-3-indolyl)-1-(5-methyl-1-pyrrolin-2-yl)quinoline,
1-[(tert.-butylimino)methyl]-1,2-dihydro-2-(3-indolyl)-quinoline hydrochloride,
1-[(cyclohexylimino)methyl]1,2-dihydro-2-(5-methoxy-3-indolyl)quinoline hydrochloride,
1,2-dihydro-2-(3-indolyl)-1-(1-pyrrolin-2-yl)quinoline,
1,2-dihydro-2-(3-indolyl)-1-(5,5-dimethyl-1-pyrrolin-2-yl)quinoline,
1,2-dihydro-2-(3-indolyl)-6-methoxy-1-(5,5-dimethyl-1-pyrrolin-2-yl)quinoline hydrochloride,
1(5,5-dimethyl-1-pyrrolin-2-yl)-1,2-dihydro-6-methoxy-2-(5-methoxy-3-indolyl)quinoline hydrochloride,
1,2-dihydro-6-isopropoxy-2-(5-methoxy-3-indolyl)-1-(5-methyl-1pyrrolin-yl)quinoline,
with methyl iodide employing sodium hydride in dimethylformamide according to the procedure of Example 34 provides the respective N-methylindolylimidoyldihydroquinolines:
1,2-DIHYDRO-6-METHOXY-2-(1-METHYL-5-METHOXY-3-INDOLYL)-1-(5-METHYL-1-PYRROLIN-2-YL)QUINOLINE,
1-[(tert.-BUTYLIMINO)METHYL]-1,2-DIHYDRO-2-(1-METHYL-3-INDOLYL)QUINOLINE,
1[(CYCLOHEXYLIMINO)METHYL]-1,2-DIHYDRO-2-(1-METHYL-5-METHOXY-3-INDOLYL)QUINOLINE,
1,2-DIHYDRO-2-(1METHYL-3-INDOLYL)-1(1PYRROLIN-2-YL)QUINOLINE,
1,2-DIHYDRO-2-(1-METHYL-3-INDOLYL)-1-(5,5-DIMETHYL-1-PYRROLIN-2-YL)QUINOLINE,
1,2-DIHYDRO-2-(1-METHYL-3-INDOLYL)-6-METHOXY-1-(5,5-DIMETHYL-1PYRROLIN-2-YL)QUINOLINE,
1-(5,5-DIMETHYL-1-PYRROLIN-2-YL)-1,2-DIHYDRO-6-METHOXY-2-(1-METHYL-5-METHOXY-3-INDOLYL)QUINOLINE,
1,2-DIHYDRO-6-ISOPROPOXY-2-(1-METHYL-5-METHOXY-3-INDOLYL)-1-(5-METHYL-1-PYRROLIN-2YL)QUINOLINE.

Additional N-alkylindolylimidoyldihydroquinolines are obtained by substituting alkyl halides for methyl iodide. For instance, alkylation of 1,2-dihydro-2-(3-indolyl)-1-(5-methyl-1-pyrrolin-2-yl)quinoline with isopropyl bromide provides 1,2-DIHYDRO-2-(1-ISOPROPYL-3-INDOLYL)-1-(5-METHYL-1-PYRROLIN-2YL)QUINOLINE.

EXAMPLE 40

Alkylation of 1-(5,5-dimethyl-1-pyrrolin-2-yl)-1,2,3,4-tetrahydro-2-(3-indolyl)quinoline with methyl iodide employing sodium hydride according to the procedure of Example 34 affords a 41 percent yield of analytically pure 1-(5,5-DIMETHYL-1-PYRROLIN-2-YL)-1,2,3,4-tetrahydro-2-(1-METHYL-3-INDOLYL)QUINOLINE, m.p. 138.5°–139.5°C. (corr.) (from isopropyl ether).

Analysis—Calcd. for $C_{24}H_{27}N_3$ (percent): C, 80.63; N, 7.61; N, 11.75. Found (percent): C, 80.893; H, 7.35; N, 11.97.

NMR delta (ppm) ($CDCl_3$, TMS reference): 1.23s, 1.25s, 3.60s, 5.95m.

EXAMPLE 41

Reduction of the N-alkylindolylimidoyldihydroquinolines:
1,2-dihydro-2-[(isopropylimino)methyl]-2-(1-methyl-3-indolyl)quinoline,
1,2-dihydro-2-(1-methyl-3-indolyl)-1-(5-methyl-1-pyrrolin-2-yl)quinoline,
1,2-dihydro-6-methoxy-2-(1-methyl-5-methoxy-3-indolyl)-1-(5-methyl-1-pyrrolin-2-yl)quinoline,
1-[(tert-butylimino)methyl]-1,2-dihydro-2-(1-methyl-3-indolyl)quinoline,
1-[(cyclohexylimino)methyl]-1,2-dihydro-2-(1-methyl-5-methoxy-3-indolyl)quinoline,
1,2-dihydro-2-(1-methyl-3-indolyl)-1-(1-pyrrolin-2-yl)quinoline,
1,2-dihydro-2-(1-methyl-3-indolyl)-6-methoxy-1-(5,5-dimethyl-1-pyrrolin-2-yl)quinoline,
1-(5,5-dimethyl-1-pyrrolin-2-yl)-1,2-dihydro-6-methoxy-2-(1-methyl-5-methoxy-3-indolyl)quinoline,
1,2-dihydro-6-isopropoxy-2-(1-methyl-5-methoxy-3-indolyl)-1-(5-methyl-1-pyrrolin-2-yl)quinoline,
1,2-dihydro-2-(1-isopropyl-3-indolyl)-1-(5-methyl-1-pyrrolin-2-yl)quinoline,
according to the procedure of Example 11 provides the respective N-alkylinodolylimidoyltetrahydroquinolines:
1,2,3,4-TETRAHYDRO-1[(ISOPROPYLIMINO)METHYL]-2-(1-METHYL-3-INDOLYL)QUINOLINE,
1,2,3,4-TETRAHYDRO-2-(1METHYL-3-INDOLYL)-1-(5-METHYL-1-PYRROLIN-2YL)QUINOLINE,
1,2,3,4-TETRAHYDRO-6-METHOXY-2-(1METHYL-5-METHOXY-3-INDOLYL)-1-(5-METHYL-1-PYRROLIN-2-YL)QUINOLINE,
1-[(tert-BUTYLIMINO)METHYL]-1,2,3,4-TETRAHYDRO-2-(1-METHYL-3-INDOLYL)QUINOLINE, 1-](CYCLOHEXYLIMINO)METHYL]-1,2,3,4-TETRAHYDRO-2-(1-METHYL-5-METHOXY-3-INDOLYL)QUINOLINE, 1,2,3,4-TETRAHYDRO-2-(1-METHYL-3-INDOLYL)-1-(1-PYRROLIN-2-YL)QUINOLINE, 1,2,3,4-TETRAHYDRO-2-(1-METHYL-3-INDOLYL)-6-METHOXY-1-(5,5-DIMETHYL-1-PYRROLIN-2-YL)QUINOLINE, 1-(5,5-DIMETHYL-1-PYRROLIN-2-YL)-1,2,3,4-TETRAHYDRO-6-METHOXY-2-(1-METHYL-5-METHOXY-3-INDOLYL)QUINOLINE, 1,2,3,4-TETRAHYDRO-6-ISOPROPOXY-2-(1-METHYL-5-METHOXY-3-INDOLYL)-1-(5-METHYL-1-PYRROLIN-2-YL)QUINOLINE, 1,2,3,4-TETRAHYDRO-2-(1-ISOPROPYL-3-INDOLYL)-1-(5-METHYL-1-PYRROLIN-2YL)QUINOLINE.

EXAMPLE 42

Reduction of 1,2-dihydro-1-(1-methyl-3-indolyl)-2-(1-pyrrolin-2-yl)isoquinoline according to the procedure of Example 11 affords a 65 percent yield of analytically pure 1,2,3,4-TETRAHYDRO-1-(1-METHYL-3-INDOLYL)-2-(1-PYRROLIN-2YL)ISOQUINOLINE, m.p. 167.0°–168.5°C. (corr.) (from isopropyl ether).

Analysis—Calcd. for $C_{22}H_{23}N_3$ (percent): C, 80.21; H, 7.04; N, 12.75. Found (percent): C, 80.17; H, 6.92; N, 12.74. NMR delta (ppm) CDCl$_3$, TMS reference): 1.20 quintet (7.2), 3.67s, 6.53s, 6.73s, 7.70m.

EXAMPLE 43

Reduction of N-alkylindolylimidoyldihydroisoquinolines:
 1,2-dihydro-2-[(isopropylimino)methyl]-1-(1-methyl-3-indolyl)-isoquinoline,
 1,2-dihydro-1-(1-methyl-3-indolyl)-2-(5-methyl-1-pyrrolin-2-yl)isoquinoline,
 1,2-dihydro-1-(1-methyl-3-indolyl)-2-(5,5-dimethyl-1-pyrrolin-2-yl)isoquinoline,
 1,2-dihydro-1-(1-methyl-5-methoxy-3-indolyl)-2-(5-methyl-1-pyrrolin-2-yl)isoquinoline,
 1,2-dihydro-1-(1-methyl-5-methoxy-3-indolyl)-2-(5,5-dimethyl-1-pyrrolin-2-yl)isoquinoline,
 1,2-dihydro-1-(1-methyl-5-methoxy-3-indolyl)-2-(1-pyrrolin-2-yl)isoquinoline,
 1,2-dihydro-1-(1-isopropyl-3-indolyl)-2-(5-methyl-1-pyrrolin-2-yl)isoquinoline,
according to the procedure of Example 11 provides the respective N-alkylindolylimidoyltetrahydroisoquinolines:
 1,2,3,4-TETRAHYDRO-2-[(ISOPROPYLIMINO)METHYL]-1-(1-METHYL-3-INDOLYL)ISOQUINOLINE,
 1,2,3,4-TETRAHYDRO-1-(1-METHYL-3-INDOLYL)-2-(5-METHYL-1-PYRROLIN-2-YL)ISOQUINOLINE,
 1,2,3,4-TETRAHYDRO-1-(1-TETRAHYDRO-1-(1-METHYL-3-INDOLYL)-2-(5,5-DIMETHYL-1-PYRROLIN-2-YL)ISOQUINOLINE,
 1,2,3,4-TETRAHYDRO-1-(1-METHYL-5-METHOXY-3-INDOLYL)-2-(5-METHYL-1-PYRROLIN-2-YL)ISOQUINOLINE,
 1,2,3,4-TETRAHYDRO-1-(1-METHYL-5-METHOXY-3-INDOLYL)-2-(5,5-DIMETHYL-1-PYRROLIN-2-YL)ISOQUINOLINE,
 1,2,3,4-TETRAHYDRO-1-(1-METHYL-5-METHOXY-3-INDOLYL)-2-(1-PYRROLIN-2YL)ISOQUINOLINE,
 1,2,3,4-TETRAHYDRO-1-(1-ISOPROPYL-3-INDOLYL)-2-(5-METHYL-1-PYRROLIN-2-YL)ISOQUINOLINE.

EXAMPLE 44

Alkylation of 3,4-dihydro-4-(5,5-dimethyl-1-pyrrolin-2-yl)-3-(3-indolyl)benzo[f]quinoline hydrochloride (5.0 g., 0.012 mole) with methyl iodide (3.41 g., 0.024 mole) employing sodium hydride (57 percent oil dispersion, 1.12 g., 0.024 mole) according to the procedure of Example 34 affords 4-(5,5-DIMETHYL-1-PYRROLIN-2-YL)-3,4-DIHYDRO-3-(1-METHYL-3-INDOLYL)BENZO[f]QUINOLINE, m.p. 194.5°–196.5°C. (corr.) (from hexane).

Analysis—Calcd. for $C_{28}H_{27}N_3$ (percent); C, 82.93; H, 6.71; N, 10.36. Found (percent): EXAMPLE 83.05; H, 6.88; N, 10.59.

NMR delta (ppm) (CDCl$_3$, TMS reference): 1.37s, 3.40s, 6.40dd (9.5, 6.2), 6.57s.

EXAMPLEL 45

Alkylation of the indolylimidoyldihydrobenzoquinolines:
 3,4-dihydro-4-[(isopropylimino)methyl]-3-(3-indolyl)benzo[f]-quinoline,
 4-(5,5-dimethyl-1-pyrrolin-2-yl)-3,4-dihydro-3-(5-methoxy-3-indolyl)benzo[f]quinoline,
 3,4-dihydro-3-(5-isopropoxyindolyl)-4-(1-pyrrolin-2-yl)-benzo[f]quinoline,
with methyl iodide according to the procedure of Example 34 provides the respective N-alkylindolylimidoyldihydrobenzoquinolines:
 3,4-DIHYDRO-4-[(ISOPROPYLIMINO)METHYL]-3-(1-METHYL-3-INDOLYL)BENZO[f]QUINOLINE,
 4-(5,5-DIMETHYL-1-PYRROLIN-2-YL)-3,4-DIHYDRO-3-(5-METHOXY-1-METHYL-3-INDOLYL)BENZO[f]QUINOLINE,
 3,4-DIHYDRO-3-(5-ISOPROPOXY-1-METHYLINDOLYL)-4-(1-PYRROLIN-2-YL)BENZO[f]QUINOLINE.

Additional N-alkylindolylimidoyldihydrobenzoquinolines are obtained by substituting appropriate alkyl halides for methyl iodide. For instance, alkylation of 3,4-dihydro-4-(5,5-dimethyl-1-pyrrolin-2-yl)-3-(3-indolyl)benzo[f]quinoline with isopropyl bromide provides 3,4-DIHYDRO-4-(5,5-DIMETHYL-1-PYRROLIN-2YL)-3-(1-ISOPROPYL-3-INDOLYL)-BENZO[f]QUINOLINE.

EXAMPLE 46

Alkylation of 4-(5,5-dimethyl-1-pyrrolin-2-yl)-1,2,3,4-tetrahydro-3-(3-indoyl)benzo[f]quinoline hydrochloride with methyl iodide employing sodium hydride according to the procedure of Example 37 affords 4-(5,5-DIMETHYL-1-PYRROLIN-2-YL)-1,2,3,4-TETRAHYDRO-3-(1-METHYL-3-INDOLYL)BENZO[f]QUINOLINE, m.p. 196°–198°C. (corr.) (from ethyl acetate).

Analysis—Calcd. for $C_{28}H_{29}N_3$ (percent): C, 82.52; H, 7.17; N, 10.31. Found (percent): C, 82.30, H, 7.48; N, 10.32.

NMR delta (ppm) (CDCl$_3$, TMS reference): 1.26s, 1.30s, 3.43s, 5.90t (4.3), 6.47s.

EXAMPLE 47

Reduction of N-alkylindolylimidoyldihydrobenzoquinolines:
3,4-dihydro-4-[(isopropylimino)methyl]-3-(1-methyl-3-indolyl)benzo[f]quinoline,
3,4-dihydro-4-(5,5-dimethyl-1pyrrolin-2yl)-3-(5-methoxy-1-methyl-3-indolyl)benzo[f]quinoline,
3,4-dihydro-3-(5-isopropoxy-1-methylindole)-4-(1-pyrrolin-2-yl)benzo[f]quinoline,
3,4-dihydro-4-(5,5-dimethyl-1-pyrrolin-2-yl)-3-(1-isopropyl-3-indolyl)benzo[f]quinoline, according to the procedure of Example 11 provides the respective N-alkylindolylimidoyltetrahydrobenzoquinolines:
1,2,3,4-TETRAHYDRO-4-[(ISOPROPYLIMINO)METHYL]-3-(1-METHYL-3-INDOLYL)BENZO[f]QUINOLINE HYDROCHLORIDE,
1,2,3,4-TETRAHYDRO-4-(5,5-DIMETHYL-1-PYRROLIN-2-YL)-3-(5-METHOXY-1-METHYL-3-INDOLYL)BENZO[f]QUINOLINE HYDROCHLORIDE,
1,2,3,4-TETRAHYDRO-3-(5-ISOPROPOXY-1-METHYLINDOLE)-4-(1-PYRROLIN-2YL)BENZO[f]QUINOLINE HYDROCHLORIDE,
1,2,3,4-TETRAHYDRO-4-(5,5-DIMETHYL-1-PYRROLIN-2-YL)-3-(1-ISOPROPYL-3-INDOLYL)BENZO[f]QUINOLINE HYDROCHLORIDE.

EXAMPLE 48

Alkylation of the indolylimidoylphenanthridines:
5,6-dihydro-6-(3-indolyl)-5-(1-pyrrolin-2-yl)phenanthridine,
5,6-dihydro-6-(3-indolyl)-5-[isopropylimino)methyl]phenanthridine,
5,6-dihydro-6-(5-methoxy-3-indolyl)-5-(1-pyrrolin-2-yl)-phenanthridine,
5,6-dihydro-6-(3-indolyl)-5-(5,5-dimethyl-1-pyrrolin-2-yl)-phenanthridine with methyl iodide employing sodium hydride in dimethylformamide according to the procedure of Example 34 provides the respective N-methylindolylphenanthridines:
5,6-DIHYDRO-6-(1-METHYL-3-INDOLYL)-5-(1-PYRROLIN-2-YL)-PHENANTHRIDINE,
5,6-DIHYDRO-6-(1-METHYL-3-INDOLYL)-5-[(ISOPROPYLIMINO)-METHYL]PHENANTHRIDINE,
5,6-DIHYDRO-6-(5-METHOXY-1-METHYL-3-INDOLYL)-5-(1-PYRROLIN-2YL)PHENANTHRIDINE,
5,6-DIHYDRO-6-(1-METHYL-3-INDOLYL)-5-(5,5-DIMETHYL-1-PYRROLIN-2-YL)PHENANTHRIDINE.

What is claimed is:
1. An indolyl compound selected from the group consisting of bases having the formula

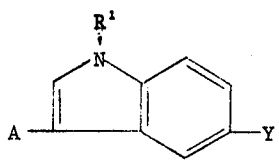

wherein A is selected from the group consisting of

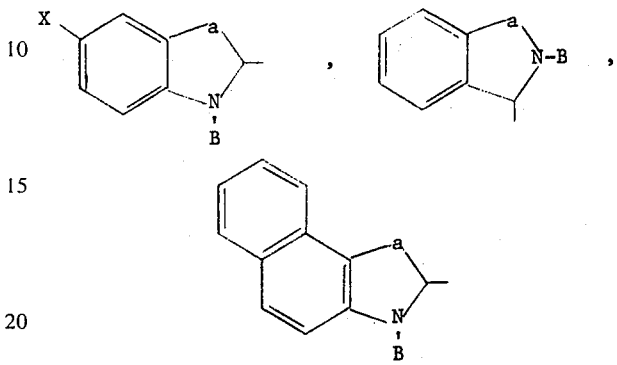

and B represents the radical

wherein
a is -CH=CH- or -CH₂CH₂-;
X is hydrogen or lower alkoxy of 1 to 4 carbon atoms inclusive;
Y is hydrogen or lower alkoxy of 1 to 4 carbon atoms inclusive;
R¹ is hydrogen or lower alkyl of 1 to 4 carbon atoms inclusive;
R² is hydrogen;
R³ is lower alkyl of 1 to 4 carbon atoms inclusive or cycloalkyl of 3 to 6 carbon atoms inclusive;
R² and R³ are joined together to form a pyrrolinyl ring which may be substituted by up to two lower alkyl groups of 1 to 4 carbon atoms inclusive; and pharmaceutically acceptable non-toxic acid addition salts thereof.

2. A compound according to claim 1 being a member selected from the group consisting of 1,2-dihydro-2-(3-indolyl)-1-(1-pyrrolin-2-yl)quinoline or a pharmaceutically acceptable non-toxic acid addition salt thereof.

3. A compound according to claim 1 being a member selected from the group consisting of 1,2-dihydro-2-(3-indolyl)-1-(5-methyl-1-pyrrolin-2-yl)quinoline or a pharmaceutically acceptable nontoxic acid addition salt thereof.

4. A compound according to claim 1 being a member selected from the group consisting of 1,2-dihydro-2-(1-methyl-3-indolyl)-1-(5-methyl-1pyrrolin-2-yl)quinoline or a pharmaceutically acceptable non-toxic acid addition salt thereof.

5. A compound according to claim 1 being a member selected from the group consisting of 1,2-dihydro-2-(3-indolyl)-1-(5,5-dimethyl-1-pyrrolin-2-yl)quinoline or a pharmaceutically acceptable non-toxic acid addition salt thereof.

6. A compound according to claim 1 being a member selected from the group consisting of 1,2-dihydro-6-methoxy-2-(5-methoxy-3-indolyl)-1-(5-methyl-1-pyrrolin-2-yl)quinoline or a pharmaceutically acceptable non-toxic acid addition salt thereof.

7. A compound according to claim 1 being a member selected from the group consisting of 1,2-dihydro-2-(3-indolyl)-6-methoxy-1-(5,5-dimethyl-1-pyrrolin-2-yl)quinoline or a pharmaceutically acceptable non-toxic acid addition salt thereof.

8. A compound according to claim 1 being a member selected from the group consisting of 1-(5,5-dimethyl-1-pyrrolin-2-yl)-1,2-dihydro-6-methoxy-2-(5-methoxy-3-indolyl)quinoline or a pharmaceutically acceptable non-toxic acid addition salt thereof.

9. A compound according to claim 1 being a member selected from the group consisting of 1,2,3,4-tetrahydro-2-(3-indolyl)-1-(1-pyrrolin-2-yl)quinoline or a pharmaceutically acceptable non-toxic acid addition salt thereof.

10. A compound according to claim 1 being a member selected from the group consisting of 1,2,3,4-tetrahydro-2-(3-indolyl)-1-(5-methyl-1-pyrrolin-2yl)quinoline or a pharmaceutically acceptable non-toxic acid addition salt thereof.

11. A compound according to claim 1 being a member selected from the group consisting of 1,2,3,4-tetrahydro-1-(5,5-dimethyl-1-pyrrolin-2-yl)-2-(3-indolyl)quinoline or a pharmaceutically acceptable non-toxic acid addition salt thereof.

12. A compound according to claim 1 being a member selected from the group consisting of 1-(5,5-dimethyl-1-pyrrolin-2-yl)-1,2,3,4-tetrahydro-2-(3-indolyl)-6-methoxyquinoline or a pharmaceutically acceptable non-toxic acid addition salt thereof.

13. A compound according to claim 1 being a member selected from the group consisting of 1-(5,5-dimethyl-1-pyrrolin-2-yl)-1,2,3,4-tetrahydro-6-methoxy-2-(5-methoxy-3-indolyl)quinoline or a pharmaceutically acceptable non-toxic acid addition salt thereof.

14. A compound according to claim 1 being a member selected from the group consisting of 1,2-dihydro-1-(3-indolyl)-2-(1-pyrrolin-2-yl)isoquinoline or a pharmaceutically acceptable non-toxic acid addition salt thereof.

15. A compound according to claim 1 being a member selected from the group consisting of 1,2-dihydro-1-(3-indolyl)-2-(5-methyl-1-pyrrolin-2-yl)isoquinoline or a pharmaceutically acceptable non-toxic acid addition salt thereof.

16. A compound according to claim 1 being a member selected from the group consisting of 1,2-dihydro-1-(3-indolyl)-2-(5,5-dimethyl-1-pyrrolin-2-yl)isoquinoline or a pharmaceutically acceptable non-toxic acid addition salt thereof.

17. A compound according to claim 1 being a member selected from the group consisting of 1,2,3,4-tetrahydro-1-(3-indolyl)-2-(5-methyl-1-pyrrolin-2-yl)isoquinoline or a pharmaceutically acceptable non-toxic acid addition salt thereof.

18. A compound according to claim 1 being a member selected from the group consisting of 1,2,3,4-tetrahydro-1-(3-indolyl)-2-(5,5-dimethyl-1-pyrrolin-2-yl)isoquinoline or a pharmaceutically acceptable non-toxic acid addition salt thereof.

19. A compound according to claim 1 being a member selected from the group consisting of 3,4-dihydro-4-(5,5-dimethyl-1-pyrrolin-2-yl)-3-(3-indolyl)benzo[f]quinoline or a pharmaceutically acceptable non-toxic acid addition salt thereof.

20. A compound according to claim 1 being a member selected from the group consisting of 4-(5,5-dimethyl-1-pyrrolin-2-yl)-3,4-dihydro-3-(1-methyl-3-indolyl)benzo[f]quinoline or a pharmaceutically acceptable non-toxic acid addition salt thereof.

21. A compound according to claim 1 being a member selected from the group consisting of 4-(5,5-dimethyl-1-pyrrolin-2-yl)-1,2,3,4-tetrahydro-3-(3-indolyl)benzo[f]quinoline or a pharmaceutically acceptable non-toxic acid addition salt thereof.

22. A compound according to claim 1 being a member selected from the group consisting of 1-(5,5-dimethyl-1-pyrrolin-2-yl)-1,2,3,4-tetrahydro-2-(1-methyl-3-indolyl)quinoline or a pharmaceutically acceptable non-toxic acid addition salt thereof.

23. A compound according to claim 1 being a member selected from the group consisting of 4-(5,5-dimethyl-1-pyrrolin-2-yl)-1,2,3,4-tetrahydro-3-(1-methyl-3-indolyl)benzo[f]quinoline or a pharmaceutically acceptable acid addition salt thereof.

* * * * *